United States Patent [19]

MacKendrick et al.

[11] Patent Number: 5,068,919
[45] Date of Patent: Dec. 3, 1991

[54] SPACESUIT SIZING SYSTEM

[75] Inventors: Robert R. MacKendrick, Milford; Mario Gonsalves, Shelton, both of Conn.

[73] Assignee: Air-Lock, Incorporated, Milford, Conn.

[21] Appl. No.: 553,980

[22] Filed: Jul. 17, 1990

[51] Int. Cl.⁵ .............. A62B 17/00; F16L 25/00; F16L 9/22
[52] U.S. Cl. .................. 2/2.1 A; 285/330; 285/357; 138/155
[58] Field of Search .............. 2/2.1 A, 2.1 R; 285/330, 357, 31, 78, 80, 298; 138/155

[56] References Cited

U.S. PATENT DOCUMENTS

| | | | |
|---|---|---|---|
| 1,455,971 | 5/1923 | Rickenbacker et al. | 258/330 |
| 2,956,823 | 10/1960 | Benjamin, Jr. et al. | 285/298 |
| 2,967,305 | 1/1961 | White et al. | 285/298 |
| 3,182,682 | 5/1965 | Gilliam | 285/31 |
| 3,287,032 | 11/1966 | Kraybill | 285/330 |
| 3,636,564 | 1/1972 | Vykukal | 2/2.1 A |
| 3,700,269 | 10/1972 | Salata | 285/78 |
| 3,776,577 | 12/1973 | Dickey | 285/31 |
| 4,151,612 | 5/1979 | Vykukal | 2/2.1 A |
| 4,295,666 | 10/1981 | Melanson | 285/357 |
| 4,369,814 | 1/1983 | Humphrey | 2/2.1 R |
| 4,594,734 | 6/1986 | Vykukal | 2/2.1 A |
| 4,596,054 | 6/1986 | MacKendrick | 2/2.1 |
| 4,598,427 | 7/1986 | Vykukal | 2/2.1 A |

OTHER PUBLICATIONS

Oberg and Jones, eds., *Machinery Handbook*, Industrial Press Incorporated, New York, 1974, pp. 1229-1320.

Primary Examiner—Werner H. Schroeder
Assistant Examiner—Michael A. Neas
Attorney, Agent, or Firm—Maurice M. Klee

[57] ABSTRACT

A system for adjusting the size of a spacesuit is provided in which threaded rings of varying sizes are screwed into annular collars which are affixed to the section of the spacesuit whose size is to be adjusted. The rings and the collars include redundant interlocks designed to prevent inadvertent uncoupling of the components. In certain preferred embodiments, multi-start, centralizing, acme screw threads are used.

26 Claims, 5 Drawing Sheets

PRIOR ART

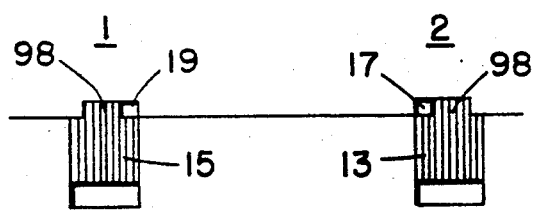
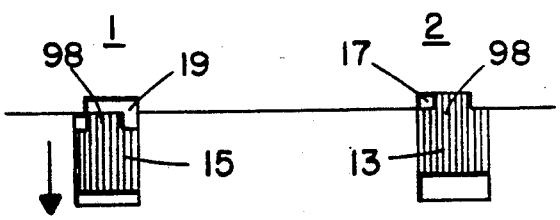
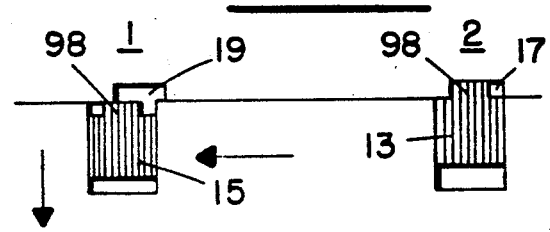
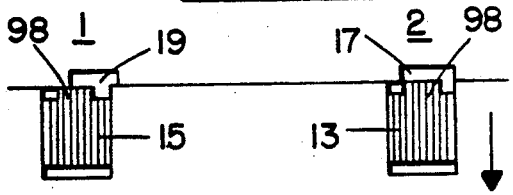
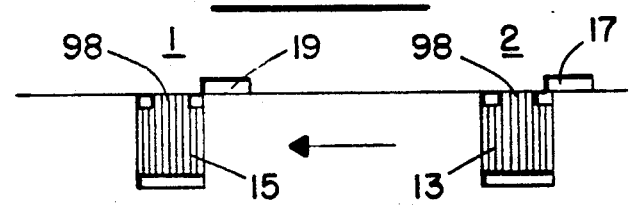
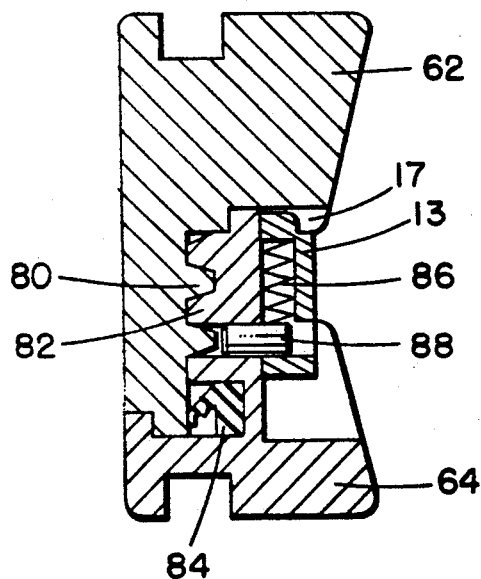
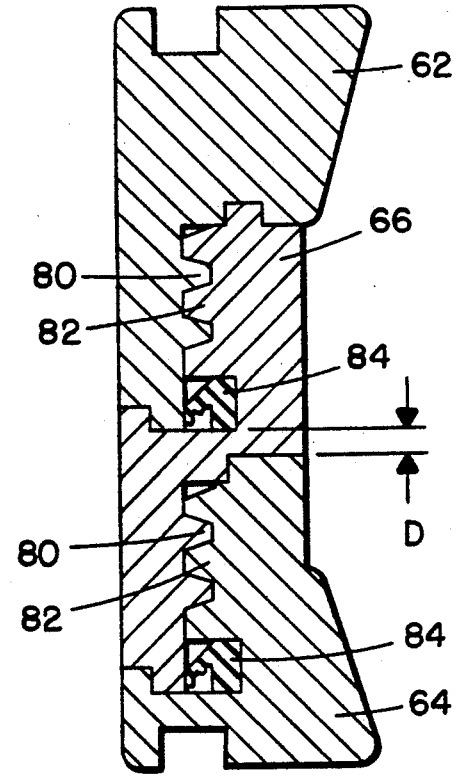

SPACESUIT SIZING SYSTEM

BACKGROUND OF THE INVENTION

1. Field of the Invention

This invention relates to spacesuits and in particular to a system for adjusting the length of various portions of a spacesuit so that the spacesuit can fit a variety of users.

2. Description of the Prior Art

FIG. 1 shows a representative spacesuit which includes helmet 10, rear entry panel 12, main body 14, shoulder portions 16, arm portions 18, gloves 20, hip portions 22, leg portions 24, and boots 26.

To accommodate users of different sizes, prior art spacesuits have employed various approaches for adjusting the size of the spacesuit to fit the user, e.g., to adjust the lengths of arm portions 18 and leg portions 24. None of these approaches have been entirely satisfactory.

An early approach involved the use of sewn-in fabric inserts in the arms and legs of the suit. Although satisfactory for a spacesuit intended to be used by only one person, this approach is plainly impractical for a spacesuit which is to be used by a number of people such as the occupants of a space station.

A more recent approach to the sizing problem is illustrated in FIGS. 2 and 3. This approach employs sizing ring 28 which is inserted between collars 36 and 38. Sizing is accomplished by providing rings of different lengths.

As shown in FIG. 2, collar 36 is attached to spacesuit fabric 32 by fabric retaining ring 40 and a series of bolts 42, one of which is shown in FIG. 2. Similarly, although not shown in FIG. 2, collar 38 is also attached to the spacesuit fabric either directly, as with collar 36, or indirectly through the attachment of collar 38 to another component of the spacesuit such as a rotating bearing assembly. Seals 34 and O-ring 44 are provided to prevent pressurized gases from escaping from the spacesuit.

Connection of sizing ring 28 to collars 36 and 38 is achieved through the use of Ortman wires 30 and 33 which are received in channels 46 and 48 (see FIG. 2). These channels are formed a the sizing ring is mated with collars 36 and 38. Specifically, channel 46 is formed through the alignment of groove 50 in the male portion of collar 36 with groove 52 in the female portion of sizing ring 28, and channel 48 is formed through the alignment of groove 54 in the male portion of the sizing ring with groove 56 in the female portion of collar 38 (see FIG. 3).

Although an improvement over the sewn-in fabric approach, the Ortman wire approach suffered from its own problems. In particular, the Ortman system was relatively difficult to assemble and disassemble. Thus, disassembly required the use of a tool to pull the curved end 58 of the Ortman wire out of its housing 60. Such a tool represented an extra part which had to be transported into space and could be lost or misplaced. Similarly, the wires themselves were extra parts which could also be lost or misplaced.

Even more importantly, however, was the fact that with the Ortman system, there simply was no assurance that the Ortman wires would not work themselves out of their channels during use, which could plainly be disastrous. In general terms, although the Ortman system worked, it was not considered a foolproof, completely reliable, and easy-to-use solution to the spacesuit sizing problem.

SUMMARY OF THE INVENTION

In view of the foregoing state of the art, it is an object of the present invention to provide an improved spacesuit sizing system which does not suffer from the problems of the prior art systems. Specifically, it is an object of the invention to provide a spacesuit sizing system which is both reliable and easy to use, i.e., a spacesuit sizing system which does not suffer from inadvertent disassembly problems and yet can be easily assembled and disassembled when desired.

It is also an object of the invention to provide a spacesuit sizing system in which assembly and disassembly can be accomplished without the use of tools. It is a further object of the invention to provide a spacesuit sizing system which does not employ removable parts which can be lost or misplaced during use.

In addition to the foregoing objects, it is a specific object of the invention to provide a fully redundant yet easy to use interlock mechanism which can be employed in spacesuit systems, as well as in other types of systems.

To achieve the foregoing and other objects, the invention provides a spacesuit sizing system which employs:

(1) two threaded annular components, e.g., two collars, which are attached to two portions of the spacesuit, e.g., to arm portion 18 and glove 20 in FIG. 1;

(2) a series of threaded annular spacer components of different sizes, e.g., a series of sizing rings, each of which can be mated with the collars; and (3) an interlock system for insuring that the sizing ring and the collars cannot inadvertently unscrew during use.

In certain preferred embodiments of the invention, the interlock system comprises:

(1) first manually-operable means which has a first (locked) state in which the mating components (e.g., a sizing ring and one of the collars) cannot be moved relative to one another and a second (unlocked) state in which those components can be moved relative to one another—for example, the first manually-operable means can be a first tab and slot mechanism;

(2) second manually-operable means which has a first (locked) state in which the mating components cannot be moved relative to one another and a second (unlocked) state in which the components can be moved relative to one another—for example, the second manually-operable means can be a second tab and slot mechanism;

(3) means for biasing the first manually-operable means into its first (locked) state—for example, a spring can be used to bias the first tab into its slot; and (4) means for counteracting the biasing means when the first manually-operable means has been manually transferred to its second (unlocked) state and movement of the components relative to one another has begun—for example, as illustrated in FIG. 12, contact of the first tab with the surface surrounding its slot can be used to prevent the tab from moving back into the slot once movement between the components has begun.

In other preferred embodiments, the interlock system is used to prevent overtightening of the screw threads and to define the play between the components in their screwed together state.

In further preferred embodiments, a multi-start screw thread, e.g., an eight-start thread, is used on the collars and the sizing rings. Such a thread allows for mating of the components with a minimum amount of relative rotation, and yet provides a strong union between the components over their entire circumference. The use of an acme screw thread and, in particular, a centralizing acme thread, is especially preferred for providing the required strong coupling between the components.

The accompanying drawings, which are incorporated in and constitute part of the specification, illustrate the preferred embodiments of the invention, and together with the description, serve to explain the principles of the invention. It is to be understood, of course, that both the drawings and the description are explanatory only and are not restrictive of the invention.

BRIEF DESCRIPTION OF THE DRAWINGS

FIG. 8 is a cross-sectional view along lines 8—8 in FIG. 11 of the preferred form of tab and slot mechanism.

FIG. 9 is a cross-sectional view showing a sizing ring mated with two collars.

FIG. 12 is a schematic diagram illustrating the operation of a preferred form of the interlock system of the invention.

DESCRIPTION OF THE PREFERRED EMBODIMENTS

Figure 1:
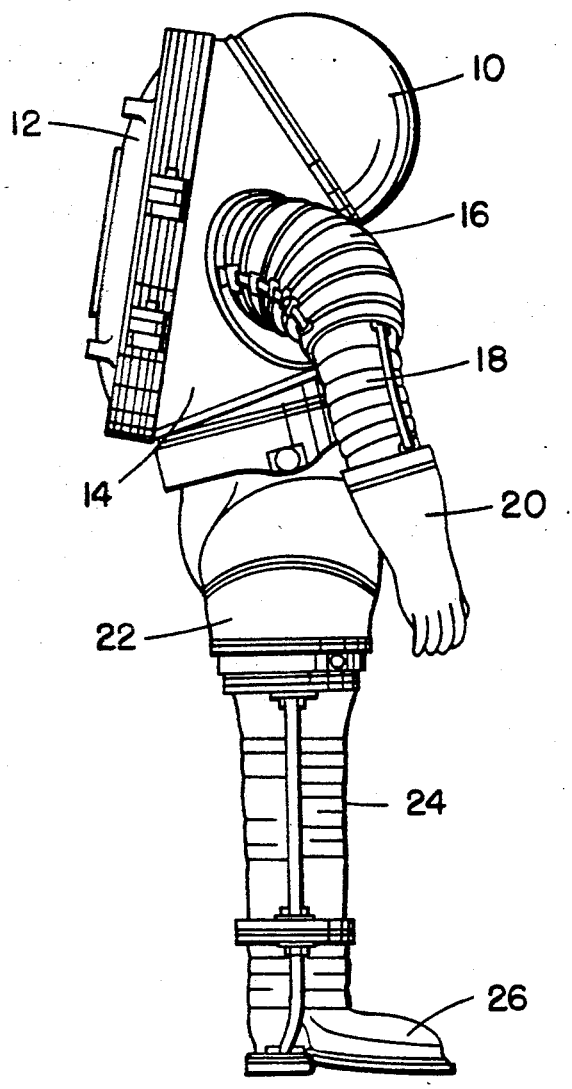
FIG. 1 is a side view of a representative spacesuit.
Figure 2:
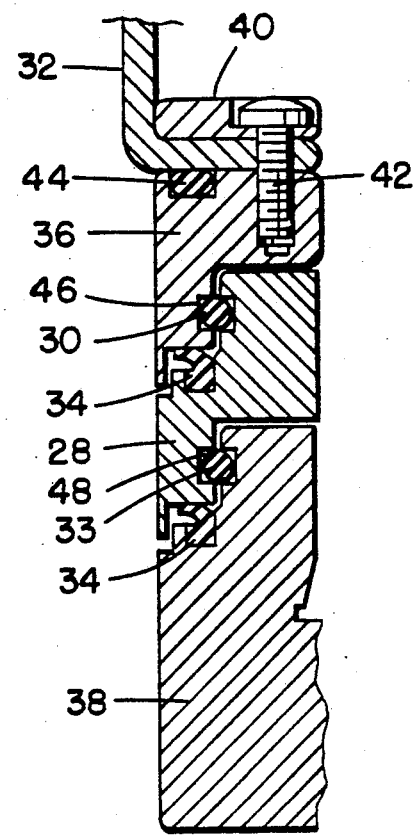
FIG. 2 is a cross-sectional view of a prior art spacesuit sizing system employing Ortman wires.
Figure 3:
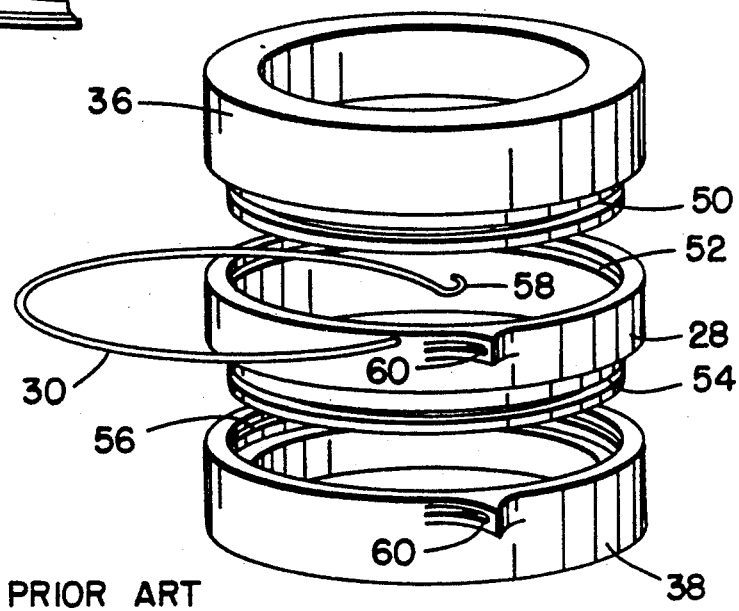
FIG. 3 is a perspective view of the Ortman system of FIG. 2.

As discussed above, the present invention relates to a sizing system for spacesuits which uses threaded collars 62 and 64, a threaded sizing ring 66, and a redundant interlock system to prevent inadvertent disassembly of the components. Among other places, the sizing system can be used to adjust a spacesuit's size at the interfaces between 1) shoulder portion 16 and arm portion 18, 2) arm portion 18 and glove 20, 3) hip portion 22 and leg portion 24, and 4) leg portion 24 and boot 26.

Figure 4:
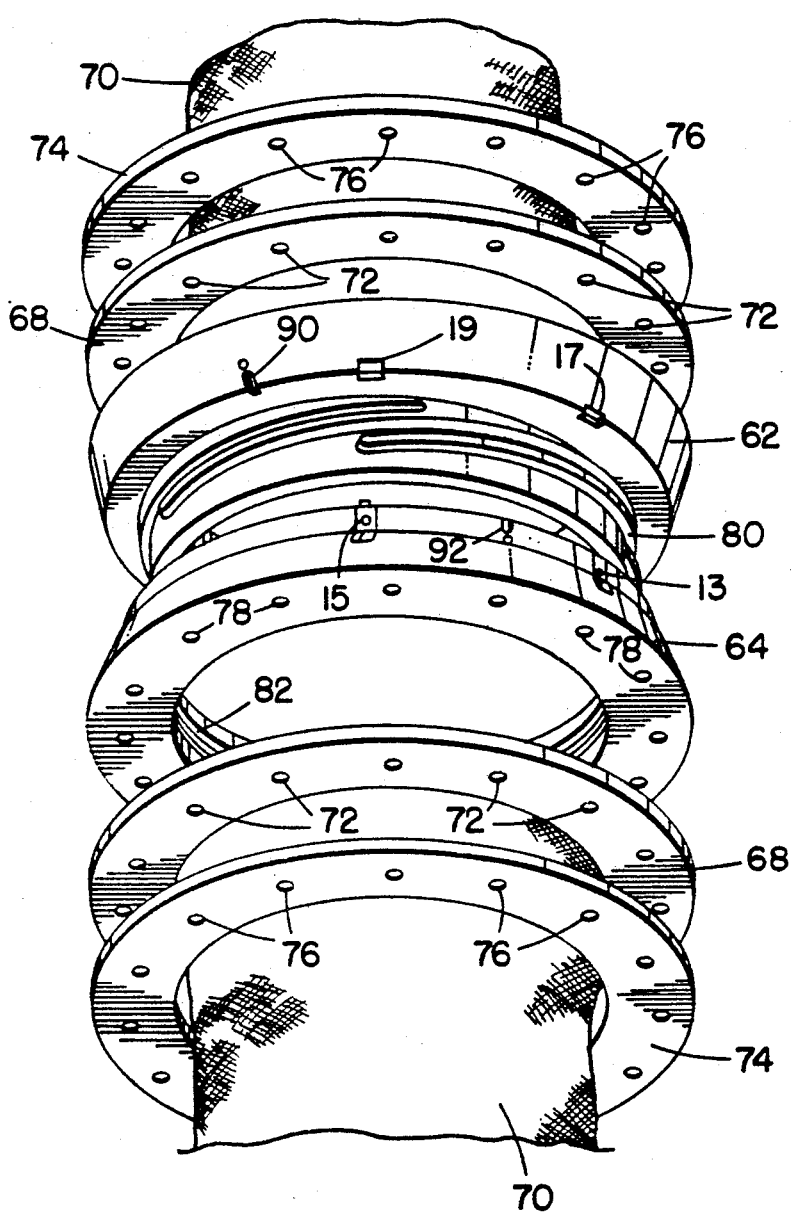
FIG. 4 is an exploded, perspective view of the threaded collars and interlock system of the present invention.
Figure 5:
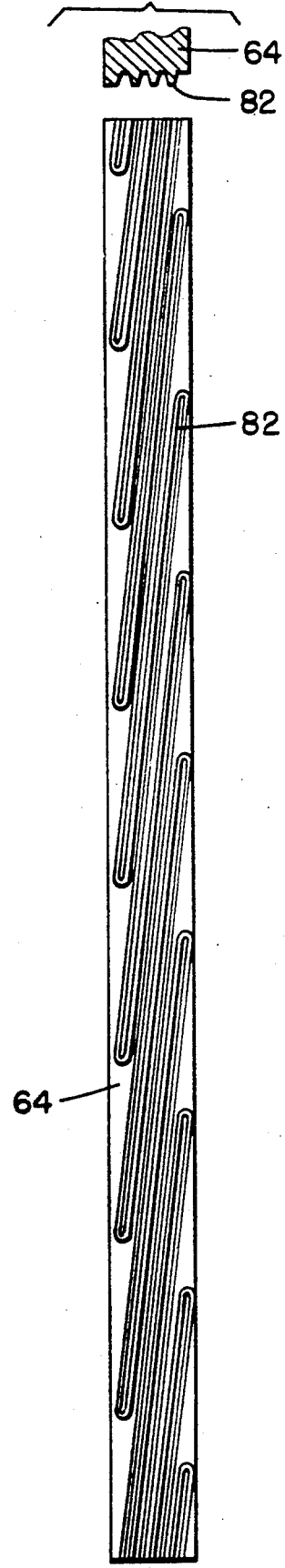
FIG. 5 shows the multi-start, centralizing acme thread used in the preferred embodiments of the invention both in cross-section and in rolled-out form.

The attachment of collars 62 and 64 to the spacesuit's fabric is illustrated in FIG. 4. As shown therein, flanges 68 having bolt holes 72 are formed at the ends of spacesuit fabric 70. The flanges, in turn, are attached to the collars by means of retaining rings 74 which include holes 76 for receiving a series of bolts (not shown) which pass through the retaining rings and the flanges and are tightened into threaded holes 78 in the collars. Although shown as being attached to spacesuit fabric on both ends, it is to be understood that either or both of the collars can attached to non-fabric components of the spacesuit, such as a bearing assembly. Also, rather than being separate components, the collars can be formed as part of such non-fabric spacesuit components.

As shown in FIG. 4, collar 62 includes external thread 80 and collar 64 includes internal thread 82. Similarly, retaining ring 66 includes an external thread 80 and an internal thread 82. All of the internal and external threads are configured to mate with one another so that collars 62 and 64 can be directly united as shown in FIG. 8 or can be united through sizing ring 66 as shown in FIG. 9. Sizing rings having different lengths are obtained by varying the dimension D in FIG. 9. Although not preferred, two or more sizing rings can be mated together and then screwed into collars 62 and 64, if desired.

Threads 80 and 82 are preferably acme threads and, in particular, centralizing acme threads, although other types of threads can be used if desired. Such threads provide a strong union between the components and resist wedging even at large diameters. A discussion of this type of thread can be found in *Machinery's Handbook*, Oberg and Jones, eds., Industrial Press Incorporated, New York, 1974, pages 1299–1320, the relevant portions of which are incorporated herein by reference. Threads 80 and 82 are also preferably multi-start threads so that only a limited amount of rotation is needed to join the components together. In practice, an eight-start thread has been found to work successfully, although more or less starts can be used if desired. Although various techniques can be used to form the threads, in practice it has been found that for collars and sizing rings made of aluminum alloys, milling of the threads, rather than machining them, produces a better finished product.

As shown in, for example, FIG. 9, each internal thread 82 has associated therewith a seal 84. These seals prevent pressurized gases from escaping from the interior of the spacesuit. Although various types of seals can be used, lip seals of the type shown in U.S. Pat. No. 4,596,054 are preferred. Such seals work reliably and yet exhibit low rotational friction which aids in the screwing together of the components.

The interlock system shown in the drawings consists of moveable tabs (members) 13 and 15 which are received in slots (apertures) 17 and 19, respectively. The system also includes alignment marks 90 and 92 which aid in the assembly of the components. Specifically, at the beginning of the assembly process, these marks are aligned with one another, and the components are then screwed together. In this way, the user is assured that tabs 13 and 15 will end up in their respective slots 17 and 19 once the components have been fully mated.

Figure 6:
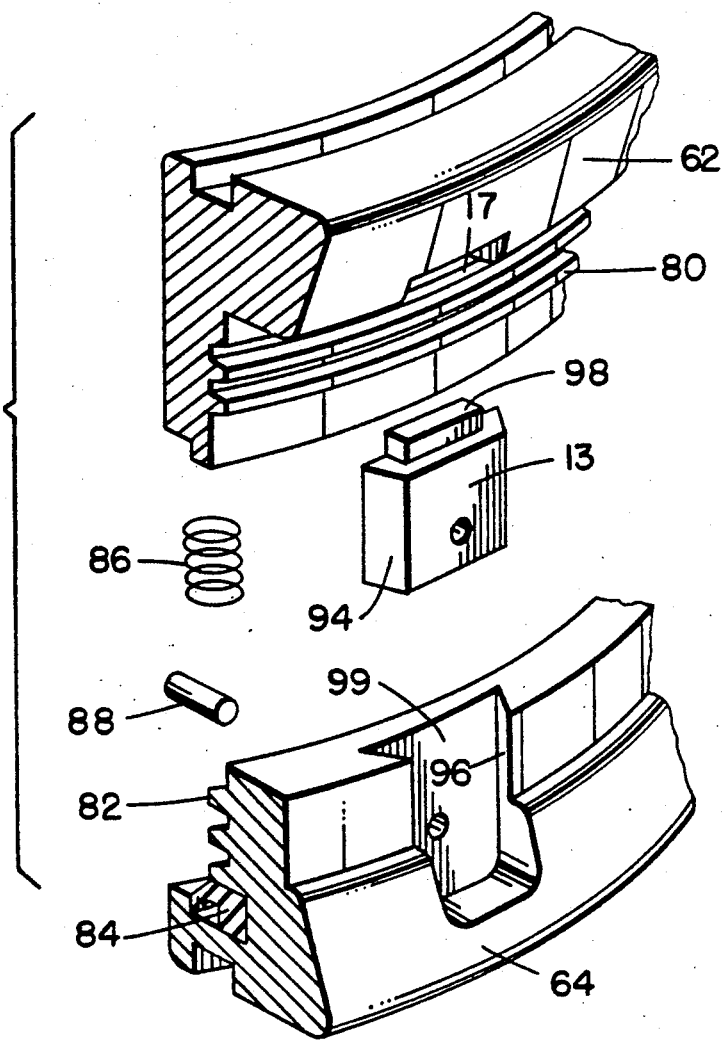
FIG. 6 is a perspective view showing a preferred form of a tab and slot mechanism for use in the interlock system of the invention.
Figure 7:
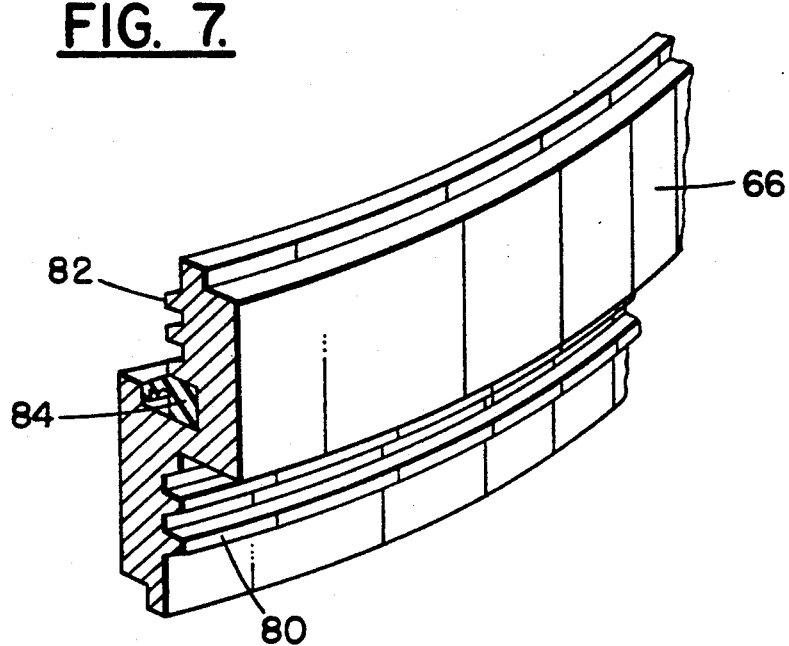
FIG. 7 is a perspective view through a portion of a threaded sizing ring.
Figure 10:
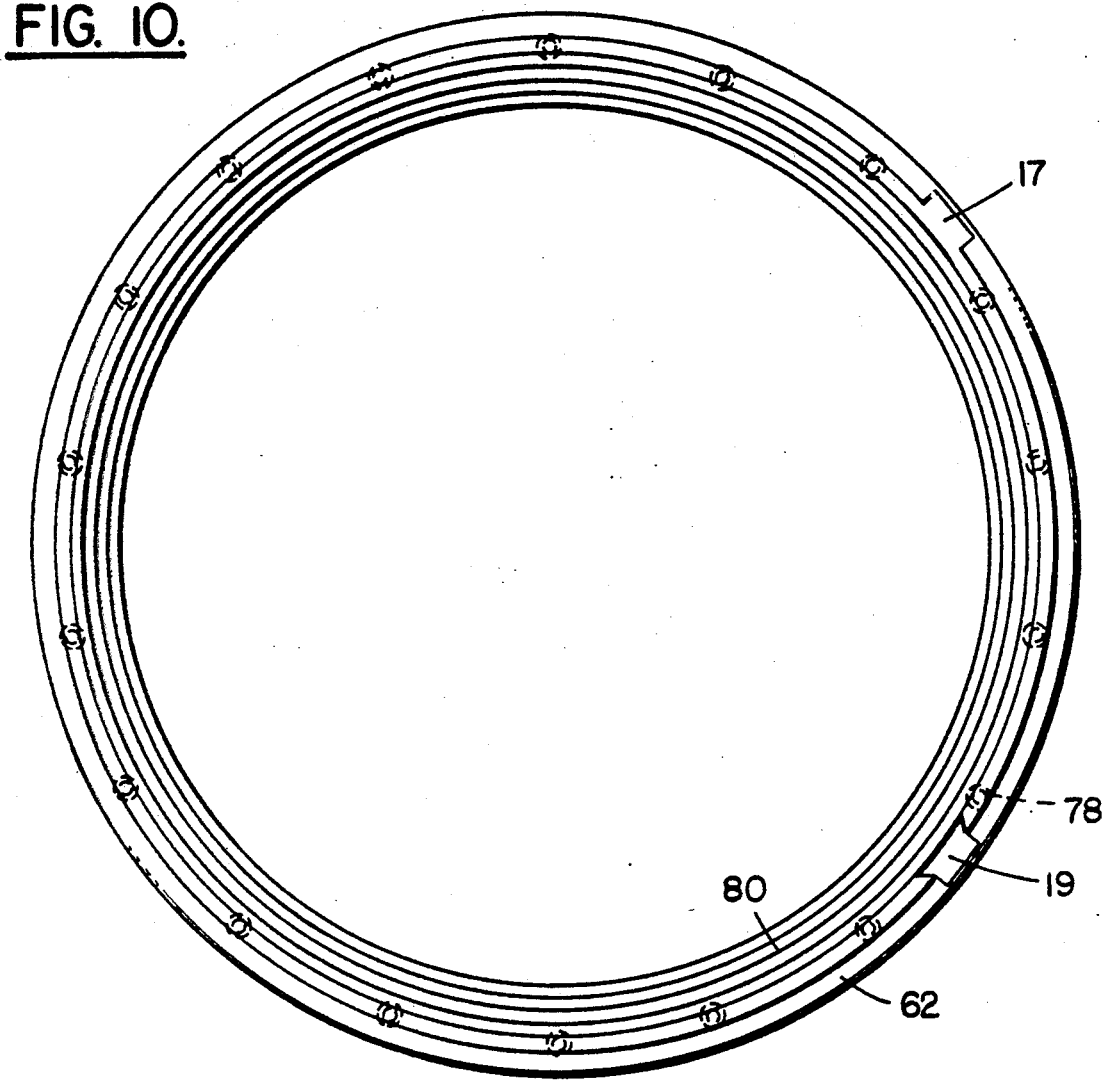
FIG. 10 is a plan view of the upper collar of FIG. 4.
Figure 11:
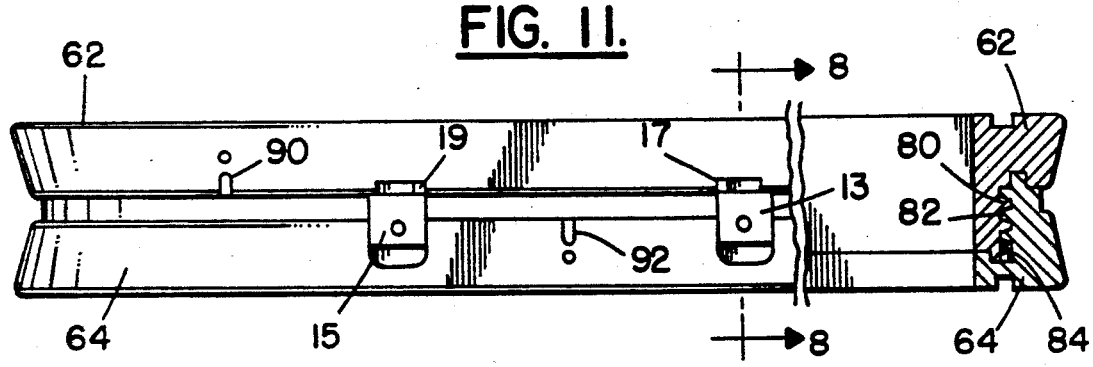
FIG. 11 is a side and a cross-sectional view of the collars of FIG. 4 in their screwed together state.

As shown in FIGS. 6 and 8, tabs 13 and 15 are held in place by means of 1) sloping sides 94 on the tab which engage corresponding sides formed in groove 99 which receives the tab, and 2) retaining pin 88. The tabs include projecting portions 98 which are adapted to be inserted into the slots. Each tab is biased into its aperture-inserted position by a coil spring 86.

As illustrated in the figures, collar 62 includes slots 17 and 19, while collar 64 includes tabs 13 and 15. If desired, this arrangement can be interchanged, i.e., collar 62 can carry the tabs and collar 64 the slots, or each collar can carry one tab and one slot. Whatever arrangement is chosen, the other collar, as well as the top and bottom sides of retaining ring 66, will include a corresponding set of tabs and slots. If desired, additional interlock mechanisms, such as a non-spring-loaded tab and a corresponding slot, can be used to provide further protection against inadvertent disassembly.

The sizes and spacings of the tabs and slots are preferably selected to 1) prevent overtightening of the threads, 2) limit the play between the components in their screwed together state, and 3) provide easy disassembly. A set of sizes and spacings which has these characteristics is shown diagrammatically in FIG. 12.

Specifically, FIG. 12A illustrates the control of overtightening and end play in the screwed together state. Thus, overtightening is prevented through the engagement of the right hand edge of projecting portion 98 of tab 13 with the right hand edge of slot 17, and end play is controlled by the engagement of those two edges in combination with the engagement of the left hand edge of projecting portion 98 of tab 15 with the left hand edge of slot 19.

Easy disassembly is achieved through the difference in sizes between slot 17 and the projecting portion 98 of tab 13, as well as by the spacing between the slots and the tabs. Specifically, the selected dimensions allow the user to work with only one tab at a time, i.e., first with tab 15 and then with tab 13. In this way, if desired, the components can be disassembled using only one hand to operate the tabs.

As shown in FIGS. 12B and 12C, the first steps in the disassembly process are to move tab 15 to its uninserted position against the biasing force of spring 86 and to begin unscrewing the components. During this initial unscrewing, the projecting portion 98 of tab 13 moves from the right hand edge of slot 17 to the left hand edge of that slot. In this position, tab 15 can no longer enter slot 19, and thus the user no longer needs to be concerned with this tab. As shown in FIGS. 12D and 12E, all that then remains to be done to complete the disassembly is to move tab 13 to its uninserted position and continue the rotation of the components until the screw threads are no longer engaged.

Although not shown in FIG. 12, the components move apart vertically as the disassembly takes place. Indeed, the pitch of the screw thread and the spacing of the tabs should preferably be chosen to insure that the amount of vertical movement between the components is sufficient to prevent tab 13 and slot 19 from engaging with one another. In this way, the user only needs to hold tab 13 in its uninserted position until slot 17 has been cleared, and does not need to continue to hold the tab in that position as the remainder of the unscrewing takes place.

Various other arrangements of the slots and tabs besides those shown can be used in the practice of the invention. For example, rather than being placed in close proximity as illustrated in the figures, tabs 13,15 and their corresponding slots 17,19 could be widely spaced around the circumference of the components.

Likewise, a single tab/slot combination, e.g., tab 15 and slot 19 in FIG. 12, could be used to control both thread tightening and end play. In this case, slot 19 and the projecting portion of tab 15 would be of approximately the same size so as to inhibit substantial rotation of the components in either the screwing or unscrewing direction. For this embodiment, tab 13 and slot 17 could continue to provide screw tightening control, or slot 17 could be enlarged so that tab 13 was not in engagement with the right hand edge of the slot when the components were in their fully screwed together state.

Similarly, instead of using the spacing of the slots and the pitch of the screw threads to prevent tab 13 from entering slot 19, tabs 13,15 and their corresponding slots 17,19 could have different dimensions so that tab 13 was too large to enter slot 19.

A variety of other modifications which do not depart from the scope and spirit of the invention will be evident to persons of ordinary skill in the art from the disclosure herein. The following claims are intended to cover the specific embodiments set forth herein as well as such modifications, variations, and equivalents.

What is claimed is:

1. Apparatus for adjusting the size of a spacesuit comprising:
   (a) a first annular component having first and second sides, the first side including means for attaching the first annular component to a first portion of the spacesuit and the second side having a first screw thread;
   (b) a second annular component having first and second sides, the first side including means for attaching the second annular component to a second portion of the spacesuit and the second side having a second screw thread;
   (c) a third annular component having first and second sides, the first side having a third screw thread for mating with the first screw thread on the first component, said first and third components having a screwed-together state wherein said first and third screw threads are screwed together, and the second side having a fourth screw thread for mating with the second screw thread on the second component, said second and third components having a screwed-together state wherein said second and fourth screw threads are screwed together;
   (d) first means for interlocking the first and third components, said means having a first state in which the first and third screw threads on said first and third components cannot be unscrewed and a second state in which said first and third screw threads can be unscrewed; and
   (e) second means for interlocking the second and third components, said means having a first state in which the second and fourth screw threads on said second and third components cannot be unscrewed and a second state in which said second and fourth screw threads can be unscrewed.

2. The apparatus of claim 1 wherein:
   the first interlocking means comprises:
      first manually-operable means having a first state in which the first and third screw threads on said first and third components cannot be unscrewed and a second state in which said first and third screw threads can be unscrewed; and
      second manually-operable means having a first state in which the first and third screw threads on said first and third components cannot be unscrewed and a second state in which said first and third screw threads can be unscrewed; and
   the second interlocking means comprises:
      first manually-operable means having a first state in which the second and fourth screw threads on said second and third components cannot be unscrewed and a second state in which said second and fourth screw threads can be unscrewed; and
      second manually-operable means having a first state in which the second and fourth screw threads on said second and third components cannot be unscrewed and a second state in which said second and fourth screw threads can be unscrewed.

3. The apparatus of claim 2 wherein:
the first interlocking means includes:
   means for biasing the first manually-operable means into its first state; and
   means for counteracting the biasing means when the first manually-operable means has been manually transferred to its second state and unscrewing of the first and third components has begun; and
the second interlocking means includes:
   means for biasing the first manually-operable means into its first state; and
   means for counteracting the biasing means when the first manually-operable means has been manually transferred to its second state and unscrewing of the second and third components has begun.

4. The apparatus of claim 1 wherein:
the first interlocking means includes:
   a first aperture associated with one of the first and third components,
   a first moveable member associated with the other of the first and third components, said first moveable member having (i) a portion for insertion in the first aperture and (ii) an inserted and an uninserted position,
   means for biasing the first moveable member into its inserted position,
   a second aperture associated with one of the first and third components, and
   a second moveable member associated with the other of the first and third components, said second moveable member having (i) a portion for insertion in the second aperture and (ii) an inserted and an uninserted position,
   wherein the apertures and the moveable members have sizes and a spacing from one another so that the first moveable member will be retained in its uninserted position at least temporarily once said member has been moved to said uninserted position and unscrewing of the first and third components has begun; and
the second interlocking means includes:
   a first aperture associated with one of the second and third components,
   a first moveable member associated with the other of the second and third components, said first moveable member having (i) a portion for insertion in the first aperture and (ii) an inserted and an uninserted position,
   means for biasing the first moveable member into its inserted position,
   a second aperture associated with one of the second and third components, and
   a second moveable member associated with the other of the second and third components, said second moveable member having (i) a portion for insertion in the second aperture and (ii) an inserted and an uninserted position,
   wherein the apertures and the moveable members have sizes and a spacing from one another so that the first moveable member will be retained in its uninserted position at least temporarily once said member has been moved to said uninserted position and unscrewing of the second and third components has begun.

5. The apparatus of claim 4 wherein:
the first interlocking means includes means for biasing the second moveable member into its inserted position, the first and third screw threads have a pitch, and the pitch and the sizes and spacing of the apertures and the moveable members are selected so that the second moveable member does not become inserted in the first aperture as the first and third components are unscrewed; and
the second interlocking means includes means for biasing the second moveable member into its inserted position, the second and fourth screw threads have a pitch, and the pitch and the sizes and spacing of the apertures and the moveable members are selected so that the second moveable member does not become inserted in the first aperture as the second and third components are unscrewed.

6. The apparatus of claim 4 wherein:
overtightening of the first and third screw threads on the first and third components is prevented by engagement of at least one of the moveable members of the first interlocking means with its corresponding aperture; and
overtightening of the second and fourth screw threads on the second and third components is limited by engagement of at least one of the moveable members of the second interlocking means with its corresponding aperture.

7. The apparatus of claim 4 wherein:
the first and third components have at least some play in their screwed-together state and wherein said play is limited by engagement of at least one of the moveable members of the first interlocking means with its corresponding aperture; and
the second and third components have at least some play in their screwed-together state and wherein said play is limited by engagement of at least one of the moveable members of the second interlocking means with its corresponding aperture.

8. The apparatus of claim 1 wherein each of the first, second, third, and fourth screw threads on the first, second, and third components is a centralizing acme thread.

9. The apparatus of claim 1 wherein each of the first, second, third, and fourth screw threads on the first, second, and third components is a multi-start screw thread.

10. The apparatus of claim 9 wherein each of the first, second, third, and fourth screw threads is an eight-start thread.

11. The apparatus of claim 9 wherein each of the first, second, third, and fourth screw threads is a centralizing acme thread.

12. The apparatus of claim 1 including a plurality of third components of different sizes, each of which can be mated with the first and second components.

13. Apparatus for connecting a first portion of a spacesuit to a second portion of a spacesuit comprising:
(a) a first annular component having first and second sides, the first side including means for attaching the first annular component to the first portion of the spacesuit and the second side having a first screw thread;
(b) a second annular component having first and second sides, the first side including means for attaching the second annular component to the second portion of the spacesuit and the second side having a second screw thread which can mate with the first screw thread on the first component; and (c) means for interlocking the first and second components, said means comprising:
  (i) first manually-operable means having a first state in which the first and second screw threads on said first and second components cannot be unscrewed and a second state in which said first and second screw threads can be unscrewed;
  (ii) second manually-operable means having a first state in which the first and second screw threads on said first and second components cannot be unscrewed and a second state in which said first and second screw threads can be unscrewed;
  (iii) means for biasing the first manually-operable means into its first state; and
  (iv) means for counteracting the biasing means when the first manually-operable means has been manually transferred to its second state and unscrewing of the first and second components has begun.

14. The apparatus of claim 13 wherein the first and second screw threads on the first and second components are centralizing acme threads.

15. The apparatus of claim 13 wherein the first and second screw threads on the first and second components are multi-start screw threads.

16. The apparatus of claim 15 wherein the first and second screw threads are eight-start threads.

17. The apparatus of claim 15 wherein the first and second screw threads are centralizing acme threads.

18. Apparatus for connecting a first portion of a spacesuit to a second portion of a spacesuit comprising:
  (a) a first annular component having first and second sides, the first side including means for attaching the first annular component to the first portion of the spacesuit and the second side having a first screw thread;
  (b) a second annular component having first and second sides, the first side including means for attaching the second annular component to the second portion of the spacesuit and the second side having a second screw thread which can mate with the first screw thread on the first component, said first and second components having a screwed-together state wherein said first and second components are screwed together; and
  (c) means for interlocking the first and second components, said means comprising:
    (i) a first aperture associated with one of the first and second components,
    (ii) a first moveable member associated with the other of the first and second components, said first moveable member having (1) a portion for insertion in the first aperture and (2) an inserted and an uninserted position,
    (iii) means for biasing the first moveable member into its inserted position,
    (iv) a second aperture associated with one of the first and second components, and
    (v) a second moveable member associated with the other of the first and second components, said second moveable member having (1) a portion for insertion in the second aperture and (2) an inserted and an uninserted position,
  wherein the apertures and the moveable members have sizes and a spacing from one another so that the first moveable member will be retained in its uninserted position at least temporarily once said member has been moved to said uninserted position and unscrewing of the first and second components has begun.

19. The apparatus of claim 18 wherein the interlocking means includes means for biasing the second moveable member into its inserted position, the first and second screw threads have a pitch, and the pitch and the sizes and spacing of the apertures and the moveable members are selected so that the second moveable member does not become inserted in the first aperture as the first and second components are unscrewed.

20. The apparatus of claim 18 wherein overtightening of the first and second screw threads on the first and second components is prevented by engagement of at least one of the moveable members with its corresponding aperture.

21. The apparatus of claim 18 wherein the first and second components have at least some play in their screwed-together state and wherein said play is limited by engagement of at least one of the moveable members with its corresponding aperture.

22. The apparatus of claim 18 wherein the first and second screw threads on the first and second components are centralizing acme threads.

23. The apparatus of claim 18 wherein the first and second screw threads on the first and second components are multi-start screw threads.

24. The apparatus of claim 23 wherein the first and second screw threads are eight-start threads.

25. The apparatus of claim 23 wherein the first and second screw threads are centralizing acme threads.

26. Apparatus for interlocking a first component with a second component, said components being moveable relative to one another from an interlocked state to a non-interlocked state, said apparatus comprising:
  a first aperture associated with one of the first and second components,
  a first moveable member associated with the other of the first and second components, said first moveable member having a portion for insertion in the first aperture,
  a second aperture associated with one of the first and second components,
  a second moveable member associated with the other of the first and second components, said second moveable member having a portion for insertion in the second aperture, and
  means for biasing the first moveable member into its inserted position,
  wherein the apertures and the moveable members have sizes and a spacing from one another so that the first moveable member will be retained in its uninserted position at least temporarily once said member has been moved to said uninserted position and relative movement of the first and second components from said interlocked state to said non-interlocked state has begun.

* * * * *